(12) United States Patent
Kury

(10) Patent No.: US 10,549,221 B2
(45) Date of Patent: Feb. 4, 2020

(54) HOSE LINE, AND FILTER SCREEN FOR A HOSE LINE

(71) Applicant: Neoperl GmbH, Mullheim (DE)

(72) Inventor: Werner Kury, Mullheim (DE)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 16/001,370

(22) Filed: Jun. 6, 2018

(65) Prior Publication Data

US 2018/0345179 A1 Dec. 6, 2018

(30) Foreign Application Priority Data

Jun. 6, 2017 (DE) .......... 10 2017 112 410

(51) Int. Cl.
*B01D 29/13* (2006.01)

(52) U.S. Cl.
CPC .......... *B01D 29/13* (2013.01); *B01D 2201/02* (2013.01)

(58) Field of Classification Search
CPC ..... B01D 29/13; B01D 2201/02; A47L 15/42; F16L 55/24; F16L 33/2071
USPC ................ 210/460, 435, 439, 446, 499, 450
See application file for complete search history.

(56) References Cited

U.S. PATENT DOCUMENTS

| | | | |
|---|---|---|---|
| 1,835,429 A | 12/1931 | Rice et al. | |
| 3,421,631 A | 1/1969 | Hirsch | |
| 9,261,213 B2 | 2/2016 | Mager et al. | |
| 2011/0114195 A1* | 5/2011 | Haas | B01D 29/96 137/15.01 |

FOREIGN PATENT DOCUMENTS

| | | |
|---|---|---|
| CN | 201242019 Y | 5/2009 |
| DE | 1610260 | 7/1971 |
| DE | 29703335 | 5/1997 |
| DE | 102016012646 | 4/2018 |
| EP | 2317202 | 5/2011 |
| EP | 2940364 | 11/2015 |

OTHER PUBLICATIONS

Chinese Office Action dated Sep. 26, 2019, for Chinese counterpart Application No. 201711469572.4, with English Translation.

* cited by examiner

*Primary Examiner* — Madeline Gonzalez
(74) *Attorney, Agent, or Firm* — Volpe and Koenig, P.C.

(57) ABSTRACT

A hose line (1) filter screen (12) having a sleeve-shaped hose connector (3) which by way of a first hose connector part-region that is configured as a connector port (4) projects through a hose opening that is provided at an end side (3) of the hose (2) into a contiguous hose end region of the hose (2), and which connector port (4) has a second hose connector part-region (6) which projects beyond the end side (3) of the hose (2), which second hose connector part-region (6) at the free end side thereof has an encircling seal retaining collar (7) that projects on the circumference. An annular flange (8) is provided on the circumference of the second hose connector part-region (6), and a union nut (9) engages behind said annular flange (8). An annular seal (10) is provided between the annular flange (8) and the seal retaining collar. The hose line (1) has a filter screen (12), which at the end side region thereof that faces the hose connector (4) is assembled on the seal retaining collar (7) of the hose connector (4).

11 Claims, 4 Drawing Sheets

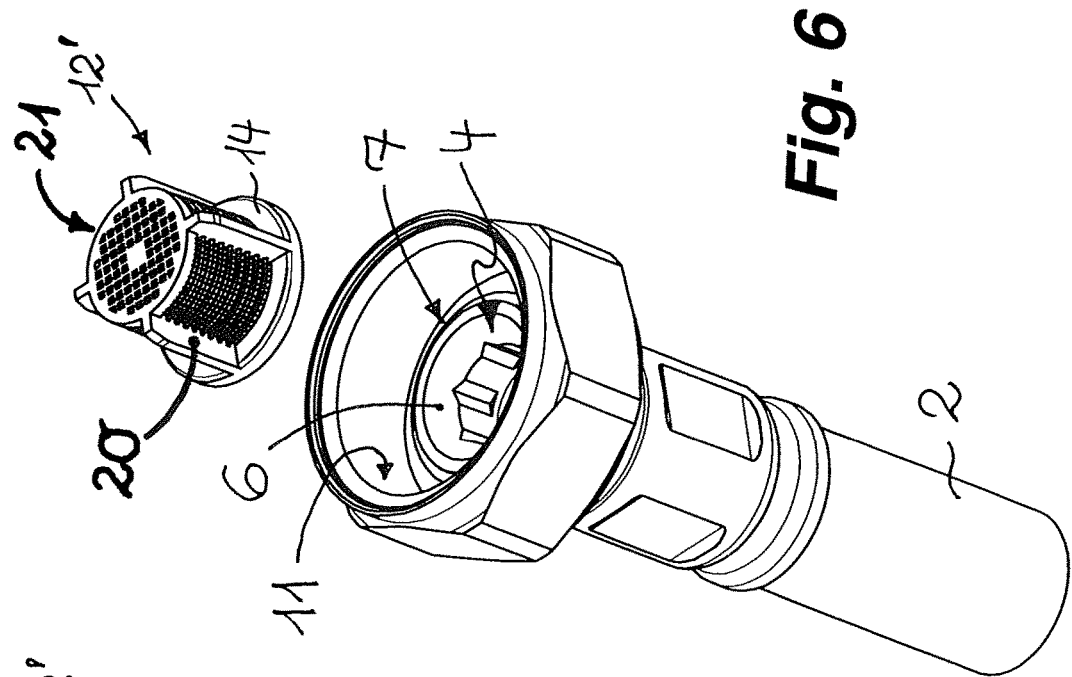
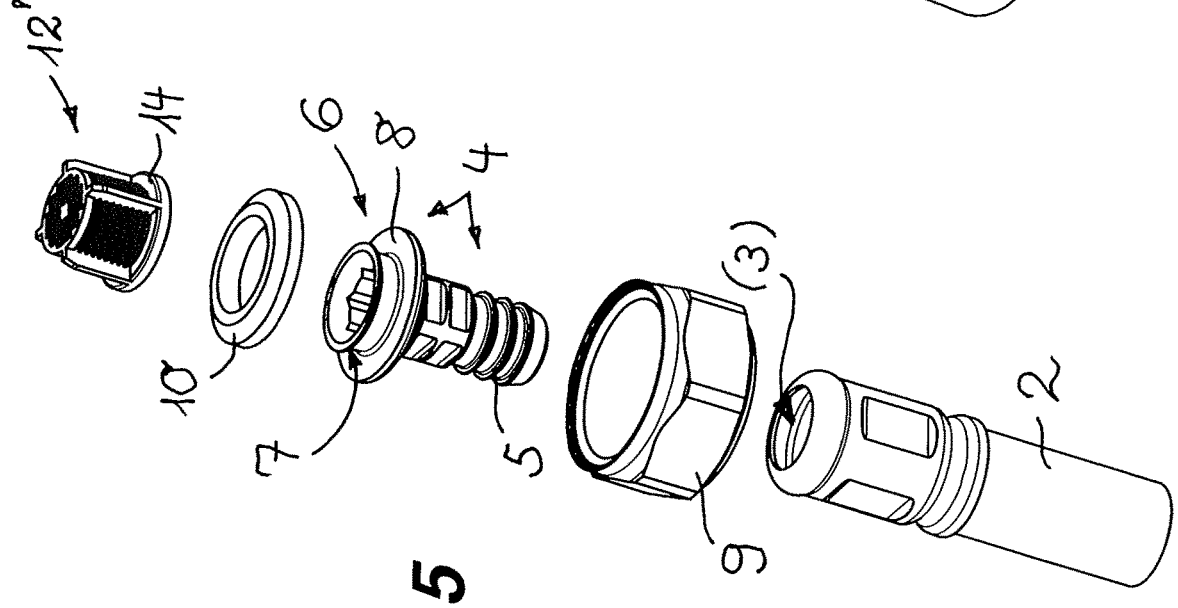

HOSE LINE, AND FILTER SCREEN FOR A HOSE LINE

INCORPORATION BY REFERENCE

The following documents are incorporated herein by reference as if fully set forth: German Patent Application No. 102017112410.1, filed Jun. 6, 2017.

BACKGROUND

The invention relates to a hose line having a flexible hose, having a sleeve-shaped hose connector which by way of a first hose connector part-region that is configured as a connector port projects through a hose opening that is provided at an end side of the hose into a contiguous hose end region of the hose, and which connector port has a second hose connector part-region which projects beyond the end side of the hose, which second hose connector part-region at the free end side thereof has an encircling seal retaining collar that projects on the circumference, wherein an annular flange is provided on the circumference of the second hose connector part-region, a union nut engaging behind said annular flange, and an annular seal being provided between said annular flange and the seal retaining collar.

The invention also relates to a filter screen for such a hose line.

Hose lines of the type mentioned at the outset are already known in the most varied embodiments. Such hose lines are thus used, for example, in order for a sanitary outlet fitting or a like water consumer point to be connected to an angle valve provided on a wall (cf. EP 2 940 364 A1). However, in sanitary water lines there is the problem that the water flow streaming through a water line can entrain remnants of chalk and dirt particles which subsequently can contaminate and impede the functioning of functional units which are provided in the onward course of the water line or at the outlet end and which, for example, regulate the maximum throughput and/or aerate the outflowing water and are intended to form the outflowing water into a homogenous, splash-free and pearly soft water jet.

Such functional units which are configured, for example, as jet regulators, optionally having a flow regulator provided upstream, or as jet aerators and are capable of being assembled on the water outlet of a sanitary outlet fitting are typically equipped with in inflow-side filter screen in order for dirt particles of this type to be filtered on the inflow side of said functional units. However, the space for respective functional units to be equipped with a filter screen is not available in all cases.

Therefore, a connector screw fitment provided in the course of a water line has been developed, in which connector screw fitment an annular seal can be placed between neighboring end faces of two line portions that are to be connected by way of the connector screw fitment, said annular seal in the annular opening of the annular shape thereof having a screen which by way of a crimped shell region is held in a friction-fitting or form-fitting manner on the interior circumference of the annular seal that delimits the annular opening.

Functional units which are configured as backflow preventers and are capable of being assembled in the course of a water line are thus already known from DE 297 03 335 U1 and DE 10 2016 012 646.9. The previously known backflow preventers have in each case one filter screen which is capable of being releasably latch-fitted to the inflow end side of said backflow preventers. However, the filter screens herein are not capable of being used without the assigned backflow preventer.

SUMMARY

There is therefore the object of in particular achieving a hose line and a filter screen of the type mentioned at the outset which still permit also the retrofitting of a filter function, without any additional processing effort being required on the hose connector, and without the filter screen required to this end being producible only with great complexity.

The achievement of this object according to the invention in the case of the hose line of the type mentioned at the outset lies in particular in that the hose line has a filter screen which at the end side region thereof that faces the hose connector is assembled on the seal retaining collar of the hose connector.

The hose line according to the invention has a flexible hose which at least at one hose end thereof is connected to a hose connector. The sleeve-shaped hose connector has a first hose connector part-region that is configured as a connector port and projects through a hose opening that is provided on the hose end into a contiguous hose end region of the hose. The hose connector also has a second hose connector part-region which projects beyond the end side or the hose end of the hose and which at the free end side thereof has an encircling seal retaining collar that projects on the circumference. An annular flange is provided on the circumference of the second hose connector part-region, a union nut engaging behind said annular flange, and an annular seal being provided between said annular flange and the seal retaining collar. In order for the hose connector to be able to be connected to an opposite hose connector of a neighboring line portion, the union nut has a fastening thread which is screw-fittable to a complementary mating thread on the hose connector of the neighboring line portion. The hose line according to the invention is assigned a filter screen which can also still be retroactively inserted when required. Since this filter screen on the end side region thereof that faces the hose connector can be assembled on the seal retaining collar of the hose connector, the hose connector of the hose line according to the invention is advantageously capable of being used with or else without the filter screen. However, the filter screen can be resorted to when required, when dirt particles that are entrained in the fluid are to be filtered in the region of the hose connector. It is a particular advantage of the hose line according to the invention that said hose line can also be retrofitted with a filter screen when required. The filter screen herein can be designed such that the latter is capable of being assembled with little complexity, optionally also by way of automated assembly. On account thereof, the production and assembly costs which are associated with the initial fitting or retrofitting of a filter screen can be substantially reduced in the case of the hose line according to the invention. Simple production methods are conceivable for the filter screen herein, wherein the filter screen can also offer a large perfused area which permits a high throughput rate also in the region of the hose connector of the hose line according to the invention.

In order for the filter screen to be able to be configured so as to have a comparatively large filter area, embodiments in which the filter screen is configured as a filter cap and, additionally or alternatively, the filter screen on the external circumference has a cylindrical filter area, are preferred.

In order for the simple assembly of the filter screen on the hose connector of the hose line according to the invention to be even further facilitated it is advantageous for the filter screen on the end side region thereof that faces the hose connector to have at least one retaining element which by way of an inboard retaining flute or retaining groove engages behind the seal retaining collar.

It can be provided in one embodiment according to the invention herein that spring bars, which are mutually spaced apart in the circumferential direction and which have a latching protrusion by way of which the spring bars can be assembled on the seal retaining collar of the hose connector, project on the end side of the filter screen that faces the hose connector. By contrast, one preferred embodiment which even further reduces the complexity associated with the production of the filter screen provides that the retaining element is configured as an annular seat which is molded to the filter screen and which on the internal annular circumference of the annular shape thereof has an encircling retaining groove.

In order for the hose line according to the invention, the hose connector thereof, and the filter screen assembled thereon, to be able to be serviced when required and to be cleaned of filtered dirt particles, it is advantageous for the filter screen to be capable of being releasably assembled on the seal retaining collar.

The filter screen of the hose line according to the invention has a large filter area, and the filter screen when configured as a filter cap offers the fluid flowing therethrough only a comparatively low hydraulic resistance even in the case of relatively long maintenance intervals and of a corresponding degree of contamination. By contrast, a filter screen that on the external circumference has a cylindrical filter area can be produced in a particularly simple and cost-effective manner, for example as a plastic injection-molded part.

One preferred embodiment according to the invention herein provides that the filter screen that is configured as a filter cap at least in a part-region that faces away from the hose connector can be configured in the shape of a cone or a truncated cone. Should the filter screen that is configured as a filter cap have a part-region that faces away from the hose connector in the shape of a cone or a truncated cone, the filter screen by way of this part-region in the shape of a cone or a truncated cone can also project into the available interior space of the line of the neighboring line portion.

Should the filter screen on the external circumference be equipped with a cylindrical filter area, the filter screen by way of the part-region thereof that has the filter areas can likewise project into the available interior space of the line of the neighboring line portion when the part-region of the filter screen that has the cylindrical filter areas is adapted to the available cross section of the hose line.

The filter screen provided according to the invention does not impede the connector screw fitment of the hose connector in relation to the neighboring line portion when the maximum external circumference of the filter screen is formed by the annular seat that is disposed on the end side of the filter screen that faces the hose connector.

One preferred embodiment according to the invention which can be produced with comparatively little complexity herein provides that the annular seat is molded in the manner of a flange to the filter screen.

One refinement according to the invention provides that the maximum diameter of the filter screen in the region of the annular seat is dimensioned such that the annular seal has an annular zone that is disposed between the annular seat of the filter screen and the internal circumference of the union nut, an annular or sleeve-shaped end side of a neighboring line portion being capable of being brought to bear tightly on said annular zone. Positive sealing in the region of the connector screw fitment is guaranteed at all times in the case of such a refining embodiment, specifically independently of whether a filter screen engages on the seal retaining collar of the hose connector of the hose line according to the invention.

One preferred field of application of the hose line according to the invention provides that the hose line is a sanitary hose line which connects an outlet fitting or a like water consumer point to an angle valve.

BRIEF DESCRIPTION OF THE DRAWINGS

Refinements according to the invention are derived from the following description of a preferred exemplary embodiment in conjunction with the claims and the drawing. The invention will be described in yet more detail hereunder by a preferred exemplary embodiment.

In the drawings:

FIG. 5 shows the hose line from FIG. 4 shown in a perspective plan view, said hose line having the hose connector thereof to which the filter screen is releasably fastenable; and FIG. 6 shows the hose line from FIGS. 4 and 5 in an exploded perspective illustration of the individual parts.

DETAILED DESCRIPTION

Figure 1:
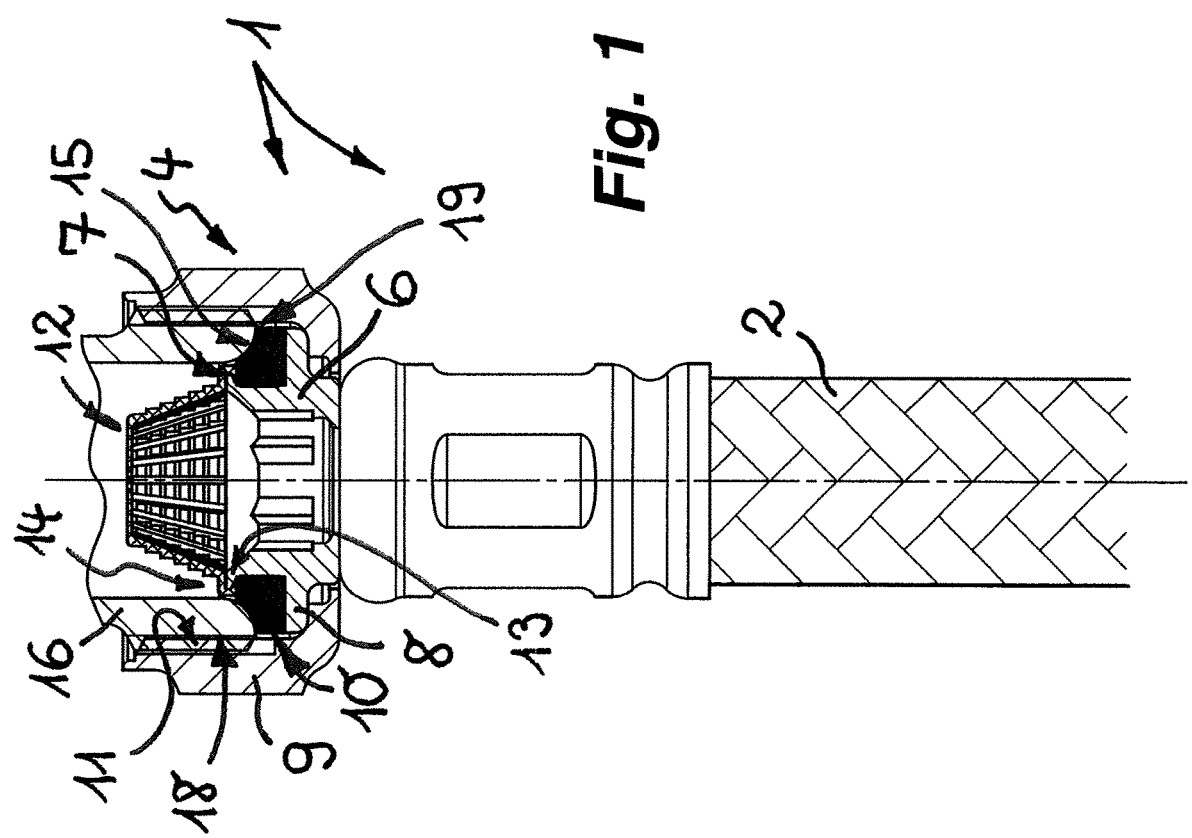
FIG. 1 shows a hose line having a flexible hose which at least at one hose end has a hose connector which here is in part longitudinally sectioned and by way of which the hose line is connected to the hose connector of a neighboring line portion.
Figure 2:
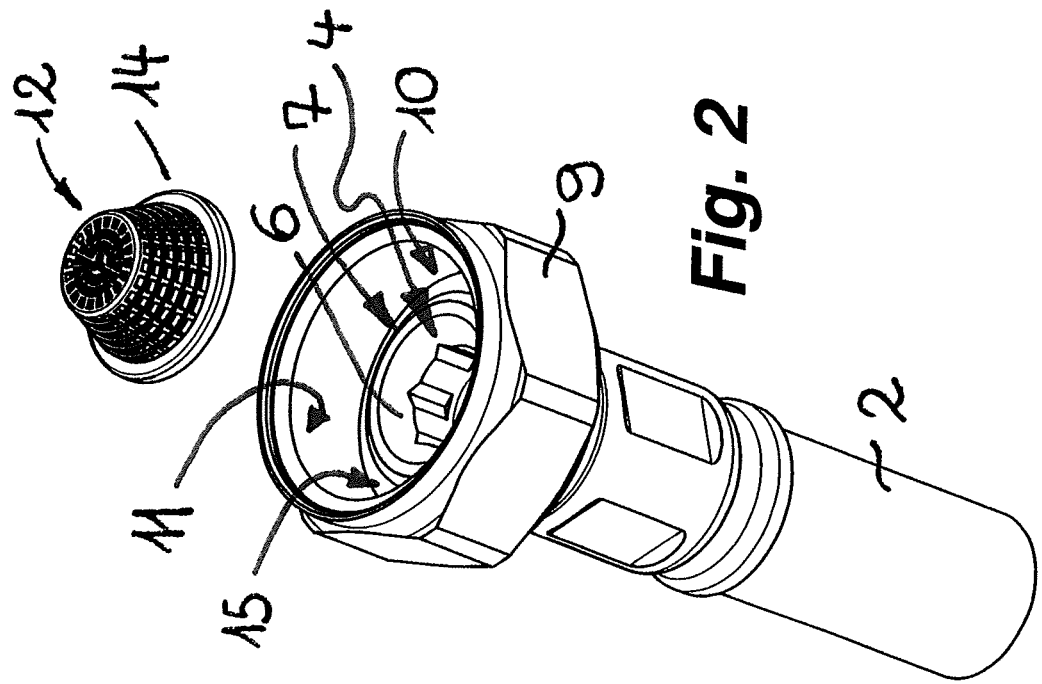
FIG. 2 shows the hose line of FIG. 1 shown in a perspective plan view, having the hose connector of said hose line, a filter screen that is releasably fastenable to the hose connector being assigned to said hose line.
Figure 3:
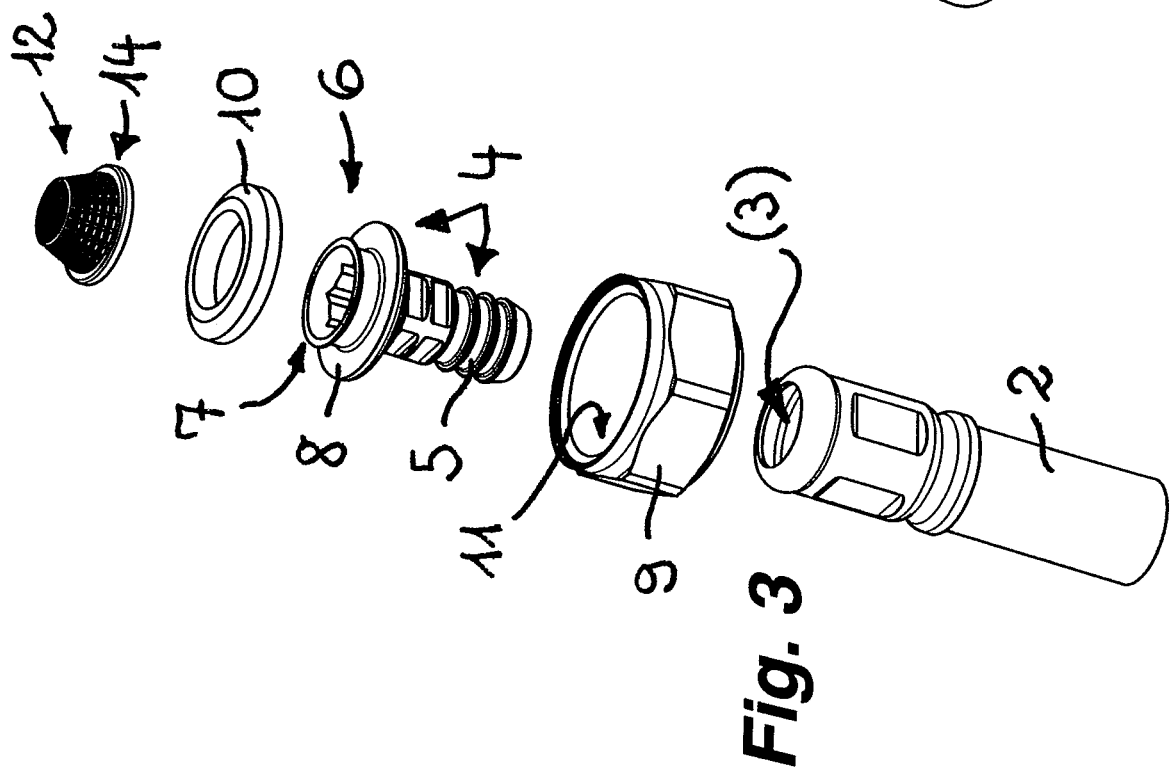
FIG. 3 shows the hose line from FIGS. 1 and 2 in an exploded perspective illustration of the individual parts.

Two embodiments 1, 1' of a hose line having a flexible hose 2 are illustrated in FIGS. 1 to 3. The hose lines 1, 1' have in each case one flexible hose 2 which at least at one hose end 3 thereof is connected to a hose connector 4. The sleeve-shaped hose connector 4 has a first hose connector part-region which is configured as a connector port 5 and which through a hose opening that is provided at the hose end 3 of the hose lines 1, 1' projects into a contiguous hose end region of the hose 2. The hose connector 4 also has a second hose connector part-region 6 which projects beyond the end side or the hose end 3 of the hose 2 and which on the free end side thereof has an encircling seal retaining collar 7 that project on the circumference. An annular flange 8 is provided on the circumference of the second hose connector part-region 6 and a union nut 9 engaging behind said annular flange 8, an annular seal 10 being provided between said annular flange 8 and the seal retaining collar 7.

In order to be able to fasten the hose connector 4 of the hose lines 1, 1' to an opposite hose connector 16 of a neighboring line portion, the union nut 9 has a fastening thread 11 which is screw-fittable to a complementary mating thread 18 on the hose connector 16 of the neighboring line portion. The fastening thread 11 on the union nut 9 can be configured as an external thread. The union nut 9 in the exemplary embodiment illustrated here has an internal thread which is screw-fittable into an external thread on the hose connector 16 of the neighboring line portion.

The hose lines 1, 1' are assigned a filter screen 12 or 12' which when required can also be retrofitted. Since said filter screen 12, 12' at the end side region thereof that faces the hose connector 4 can be assembled on the seal retaining collar 7, the hose connector 3 of the hose line 1, 1' according to the invention is advantageously capable of being used with or without the filter screen 12, 12'. However, the filter screen 12, 12' when required can be resorted to when dirt particles that are entrained in the fluid are to be filtered in the region of the hose connector 3.

The filter screen 12, 12' on the end side region that faces the hose connector 3 has at least one retaining element which by way of an inboard retaining flute or retaining groove 13 engages behind the seal retaining collar 7 on the hose connector 4 of the hose lines 1, 1'. The retaining element herein is configured as an annular seat 14 that is molded to the filter screen 12, 12', said annular seat 14 on the internal annular circumference of the annular shape thereof having the encircling retaining groove 13. The filter screen 12, 12' is capable of being releasably assembled on the seal retaining collar 7 in that the annular seat 14 that serves as a retaining element, by way of the retaining groove 13 of said annular seat 14, is push-fitted over the periphery of the seal retaining element 7 that projects on the circumference in such a manner that the annular seat 14 engages behind the seal retaining collar 7.

In order for the filter screen 12 to be able to offer a screen area that is as large as possible, the filter screen 12 that in FIGS. 1 to 3 is configured as a filter cap, at least in the part-region that faces away from the hose connector 3, is configured in the shape of a cone or, as is presently the case, of a truncated cone. The maximum external circumference of the filter screen 12 herein is formed by the annular seat 14 that is disposed on the end side of the filter screen 12 that faces the hose connector 4 and serves as a retaining element. The annular seat 14 here is molded in the manner of a flange to the part-region of the filter screen 12 that is in the shape of a truncated cone. The maximum diameter of the filter screen 12 in the region of the annular seat 14 herein is dimensioned such that the annular seal 10 has an annular zone 15 that is disposed between the annular seat 14 of the filter screen 12 and the internal circumference of the union nut, an annular or sleeve-shaped end side 19 of the neighboring line portion being capable of being brought to bear tightly on said annular zone 15.

Figure 4:
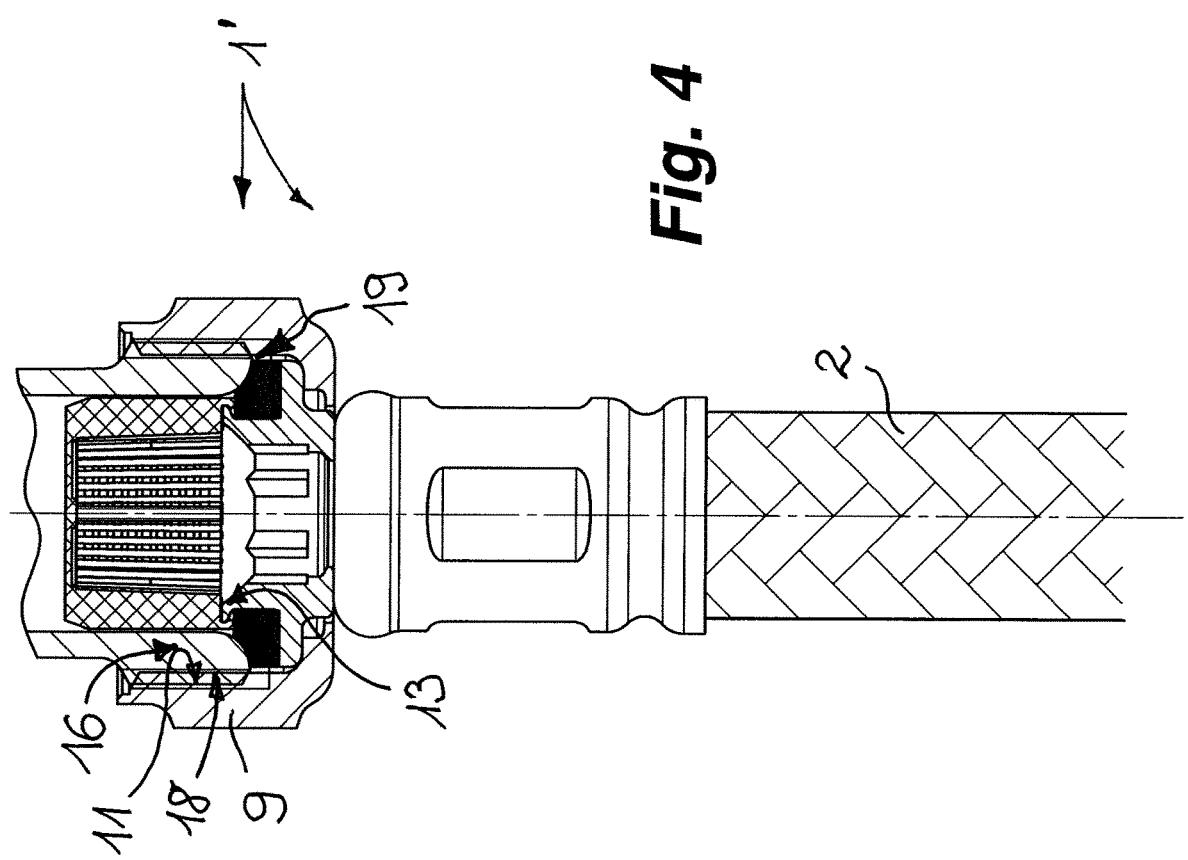
FIG. 4 shows a further exemplary embodiment of a hose line which differs from the hose line shown in FIGS. 1 to 3 in the filter screen that is used on the hose connector, said filter screen here having a cylindrical screen area.

The filter screen 12' of the hose line 1' shown in FIGS. 4 to 6 has a part-region which has the substantially cylindrical filter area. The filter screen 12' of the hose line 1' shown in FIGS. 4 to 6, by way of the part-region of said filter screen 12' that has the filter area projects into the available hose cross section of the neighboring hose line. In order for a sufficient spacing between the part-region of the filter screen 12' that has the filter area and the internal circumference of the hose of the neighboring hose line to be ensured, strip-shaped spacers 20 which extend so as to be axially parallel with the longitudinal axis of the screen and which are preferably disposed so as to be distributed uniformly across the circumference of the filter screen 12' are provided on the outer circumference of the filter screen 12'. These strip-shaped spacers 20 extend from the inflow-side end face of the filter screen up to the annular seat 14. The radius of the filter screen 12' that extends up to the longitudinal peripheries of the spacers 20 is dimensioned such that the filter screen 12' by way of the spacers 20 thereof can be inserted into the available hose cross section of the hose line that is opposite the hose connector of the hose line 1'. In order for the provided screen area of the filter screen 12' to be even further increased it can be expedient for the inflow-side end face 21 of the filter screen 12' to also have a screen structure having a multiplicity of throughflow holes.

The hose line 1, 1' illustrated here is capable of being used in a variety of ways, in particular with the filter screen 12, 12' assembled on the hose connector 4. An embodiment in which the hose line 1, 1' is a sanitary hose line 1 which connects an outlet fitting or a like water consumer point to an angle valve that is assembled on a wall is preferred herein.

LIST OF REFERENCE SIGNS 1, 1' Hose line
2 Hose
3 Hose end
4 Hose connector
5 Connector port
6 Second hose connector part-region
7 Seal retaining collar
8 Annular flange
9 Union nut
10 Annular seal
11 Fastening thread
12, 12' Filter screen
13 Retaining groove
14 Annular seat
15 Annular zone on the annular seal 10
16 Hose connector
18 Mating thread
19 End side
20 Spacer
21 End face

The invention claimed is:
1. A hose line (1, 1'), comprising:
a flexible hose (2);
a sleeve-shaped hose connector (3) having a first hose connector part-region configured as a connector port (4) that projects from a hose opening that is provided at an end side of the hose (2) into a contiguous hose end region of the hose (2) and a second hose connector part-region (6) which projects beyond the end side of the hose (2), an encircling seal retaining collar (7) is located at a free end side of the second hose connector part-region (6), the encircling seal retaining collar (7) projects about a circumference, and an annular flange (8) is provided on the second hose connector part-region (6);
a union nut (9) that engages behind said annular flange (8);
an annular seal (10) provided between said annular flange (8) and the seal retaining collar (7); and
a filter screen (12, 12') assembled on the seal retaining collar (7) of the hose connector (4) at an end side region thereof that faces the hose connector (4).
2. The hose line as claimed in claim 1, wherein the filter screen (12, 12') is configured as a filter cap.
3. The hose line as claimed in claim 1, wherein the filter screen (12, 12') on the end side region thereof that faces the hose connector (4) has at least one retaining element, configured as an inboard retaining flute or retaining groove (13), said at least one retaining element engages behind the seal retaining collar (7).

4. The hose line as claimed in claim 3, wherein the retaining element is configured as an annular seat (14) which is molded to the filter screen (12, 12'), said annular seat (14) on an internal annular circumference thereof includes the encircling retaining groove (13).

5. The hose line as claimed in claim 1, wherein the filter screen (12, 12') is releasably assembled on the seal retaining collar (7).

6. The hose line as claimed in claim 2, wherein the filter screen (12) at least in a part-region thereof that faces away from the hose connector (4) has a conical shape or a truncated cone shape.

7. The hose line as claimed in claim 1, wherein the filter screen (12) has a cylindrical filter area on an external circumference thereof.

8. The hose line as claimed in claim 7, wherein the filter screen (12) further comprises spacers (20) molded to an external circumference of the filter screen (12') on the cylindrical filter area.

9. The hose line as claimed in claim 4, wherein the annular seat (14) is molded as a flange to the filter screen (12, 12').

10. The hose line as claimed in claim 4, wherein a maximum diameter of the filter screen (12) in a region of the annular seat (14) is dimensioned such that the annular seal (10) has an annular zone (15) that is disposed between the annular seat (14) of the filter screen (12) and an internal circumference of the union nut (9), and an annular or sleeve-shaped end side of a neighboring line portion is adapted to be brought to bear on said annular zone (15).

11. The hose line as claimed in claim 1, wherein the hose line is a sanitary hose line which is adapted to connect an outlet fitting or a water dispenser point to an angle valve.

* * * * *